United States Patent
Lucas (10) Patent No.: US 10,047,649 B2
(45) Date of Patent: Aug. 14, 2018

(54) CONCENTRIC AXIAL OIL SCOOP

(71) Applicant: United Technologies Corporation, Hartford, CT (US)

(72) Inventor: James L. Lucas, Hamden, CT (US)

(73) Assignee: United Technologies Corporation, Farmington, CT (US)

(*) Notice: Subject to any disclaimer, the term of this patent is extended or adjusted under 35 U.S.C. 154(b) by 260 days.

(21) Appl. No.: 14/754,124

(22) Filed: Jun. 29, 2015

(65) Prior Publication Data

US 2016/0376947 A1 Dec. 29, 2016

(51) Int. Cl.
| | |
|---|---|
| *F01D 25/18* | (2006.01) |
| *F01M 11/02* | (2006.01) |
| *B23P 6/00* | (2006.01) |
| *F01M 9/06* | (2006.01) |
| *F02C 7/06* | (2006.01) |
| *F16C 3/02* | (2006.01) |
| *F16C 33/66* | (2006.01) |
| *F16C 19/06* | (2006.01) |

(52) U.S. Cl.
CPC .............. *F01M 9/06* (2013.01); *F01D 25/18* (2013.01); *F01D 25/186* (2013.01); *F01M 11/02* (2013.01); *F02C 7/06* (2013.01); *F16C 3/02* (2013.01); *F16C 33/6659* (2013.01); *F16C 33/6677* (2013.01); *F16C 19/06* (2013.01)

(58) Field of Classification Search
CPC ........... F01D 25/18; F01M 9/06; F01M 11/02
See application file for complete search history.

(56) References Cited

U.S. PATENT DOCUMENTS

| | | | |
|---|---|---|---|
| 2,854,298 A | 9/1958 | Baumeister | |
| 3,074,688 A | 4/1959 | Muth | |
| 3,915,521 A | 10/1975 | Young | |
| 4,468,066 A | 8/1984 | Alcorta | |
| 4,545,734 A | 10/1985 | Schilder | |
| 4,844,201 A | 7/1989 | Ackerman | |
| 5,272,868 A * | 12/1993 | Ciokajlo | F01D 25/18 184/6.11 |

(Continued)

FOREIGN PATENT DOCUMENTS

| | | |
|---|---|---|
| FR | 2977636 A1 | 1/2013 |
| GB | 2140877 A | 12/1984 |

OTHER PUBLICATIONS

Szabolcs Serflek, "F-15E.info Technology Pratt & Whitney F100-PW-220/229 Engine", downloaded from <http://www.f-15e.info/technology/engines/pw2/pw2.htm>, 2007.

(Continued)

*Primary Examiner* — William E Dondero
*Assistant Examiner* — Mark K Buse
(74) *Attorney, Agent, or Firm* — O'Shea Getz P.C.

(57) ABSTRACT

Aspects of the disclosure are directed to a shaft configured with a first hole, a bearing race coupled to the shaft and configured with a second hole and a third hole, and an oil scoop configured to receive oil and provide the oil to the shaft, where the first and second holes are oriented axially with respect to the shaft, and where the third hole is oriented radially with respect to the shaft. In some embodiments, a second oil scoop is configured to receive oil and provide the oil to the shall. The oil scoop and the second oil scoop may be concentric with respect to one another.

9 Claims, 5 Drawing Sheets

(56) References Cited

U.S. PATENT DOCUMENTS

| | | | |
|---|---|---|---|
| 5,609,073 A | 3/1997 | Spooner | |
| 7,124,857 B2 | 10/2006 | Gekht | |
| 7,244,096 B2 | 7/2007 | Dins | |
| 7,455,150 B1 | 11/2008 | Gekht | |
| 7,625,126 B2 | 12/2009 | Peters | |
| 7,878,303 B2* | 2/2011 | Munson | F01D 25/183 184/11.2 |
| 7,931,407 B2 | 4/2011 | Begin | |
| 8,308,426 B2* | 11/2012 | Cigal | F01D 25/18 384/475 |
| 8,517,612 B2* | 8/2013 | Metzger | F16C 33/58 384/475 |
| 8,616,777 B1 | 12/2013 | Smith | |
| 8,899,910 B2* | 12/2014 | Makulec | F01D 25/18 184/6.11 |
| 2007/0006569 A1 | 1/2007 | Brault et al. | |
| 2008/0093171 A1* | 4/2008 | Portlock | F01D 5/022 184/6 |
| 2008/0110699 A1* | 5/2008 | Munson | F01D 25/183 184/6.11 |
| 2009/0294216 A1* | 12/2009 | Begin | F01D 25/18 184/6.11 |
| 2013/0283758 A1 | 10/2013 | Wotzak | |
| 2014/0099188 A1* | 4/2014 | Bordne | F01D 25/18 415/112 |
| 2014/0099199 A1* | 4/2014 | Kerr | F16C 33/6677 415/229 |
| 2014/0127012 A1* | 5/2014 | Maniar | F01D 25/186 415/230 |
| 2014/0127051 A1* | 5/2014 | Takahashi | F01D 25/166 417/406 |
| 2014/0241851 A1* | 8/2014 | Demitraszek | F01D 25/18 415/1 |
| 2014/0369811 A1* | 12/2014 | Malins | F02C 6/12 415/111 |
| 2016/0281527 A1* | 9/2016 | Lucas | F01D 17/06 |
| 2016/0281537 A1* | 9/2016 | Lucas | F01D 25/183 |

OTHER PUBLICATIONS

EP search report for EP16167468.4 dated Oct. 28, 2016.

* cited by examiner

CONCENTRIC AXIAL OIL SCOOP

STATEMENT REGARDING FEDERALLY SPONSORED RESEARCH OR DEVELOPMENT

This invention was made with government support under contract number W911W6-08-2-0001 awarded by the United States Army. The government has certain rights in the invention.

BACKGROUND

In connection with an aircraft, an oil circuit supplies oil to a number of bearings that are positioned at longitudinally spaced apart locations along one or more engine shafts. Bearing compartments enclose the bearing assemblies and maintain a volume of oil with an oil-air interface. Within the bearing compartments, oil is supplied under pressure and is sprayed at selected areas or diffused through bearing assemblies. The oil flow cools the bearing assemblies which develop heat under friction, lubricates the bearing assemblies, flushes out any foreign particles that develop and splashes within the bearing compartment to cool and lubricate internal surfaces before being withdrawn from the bearing compartment by, e.g., the vacuum of a scavenge pump.

Various oil circulation mechanisms are provided in flow communication with each bearing compartment to supply a continuous flow of oil to the bearing compartment and scavenge spent oil from an outlet of the bearing compartment. Oftentimes, oil is supplied to bearing compartment components, e.g., seals and bearings through a shaft mounted axial oil scoop.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine of an aircraft, comprising: a shaft configured with a first hole, a bearing race coupled to the shaft and configured with a second hole and a third hole, and an axial oil scoop configured to receive oil and provide the oil to the shaft, where the first and second holes are oriented axially with respect to the shaft, and where the third hole is oriented radially with respect to the shaft. In some embodiments, the system further comprises at least one oil jet configured to provide the oil to the oil scoop. In some embodiments, the system further comprises a second axial oil scoop configured to receive and provide oil to the shaft. In some embodiments, the system further comprises a spline configured to convey the oil axially forward to the third hole after the oil traverses at least one of the first hole and the second hole. In some embodiments, the system further comprises the third hole configured to convey the oil from the spline to at least one of a seal runner and a bearing. In some embodiments, the system further comprises a seal runner coupled to the shaft configured to transfer heat to at least a portion of the oil. In some embodiments, the system further comprises a bearing coupled to the shaft configured to transfer heat to at least a portion of the oil.

Aspects of the disclosure are directed to a method comprising: forming at least one axially-oriented hole in a shaft of an aircraft engine, forming at least one axially-oriented hole and at least one radially-oriented hole in a bearing race, coupling the shaft and the bearing race, manufacturing an axial oil scoop, and assembling the oil scoop onto the shaft. In some embodiments, the method further comprises applying heat to the oil scoop to assemble the oil scoop onto the shaft. In some embodiments, the method further comprises assembling a seal runner on the shaft. In some embodiments, the method further comprises assembling a bearing associated with the bearing race onto the shaft. In some embodiments, the method further comprises assembling a nut to clamp at least one of the seal runner or the bearing. In some embodiments, the method further comprises assembling a sub assembly formed from the bearing, the nut, the seal runner, and the shaft into a bearing housing. In some embodiments, the method further comprises assembling at least one oil jet into the bearing housing. In some embodiments, the at least one oil jet comprises a plurality of oil jets. In some embodiments, the method further comprises configuring a first of the oil jets to provide first oil to the oil scoop, and configuring a second of the oil jets to provide second oil to a second axial oil scoop. In some embodiments, the method further comprises forming threads on the shaft to accommodate a nut, forming at least one hole in a bearing, forming an annulus in the bearing, assembling the bearing onto the shaft via a bearing race, and manufacturing the nut with a second axial oil scoop. In some embodiments, the axial oil scoop and the second axial oil scoop are concentric with respect to one another. In some embodiments, the second axial oil scoop is located radially outboard of the axial oil scoop. In some embodiments, the method further comprises manufacturing a nut locking device, and coupling the nut locking device and the nut.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing one or more oil scoops (e.g., an axial oil scoop).

Figure 1A:
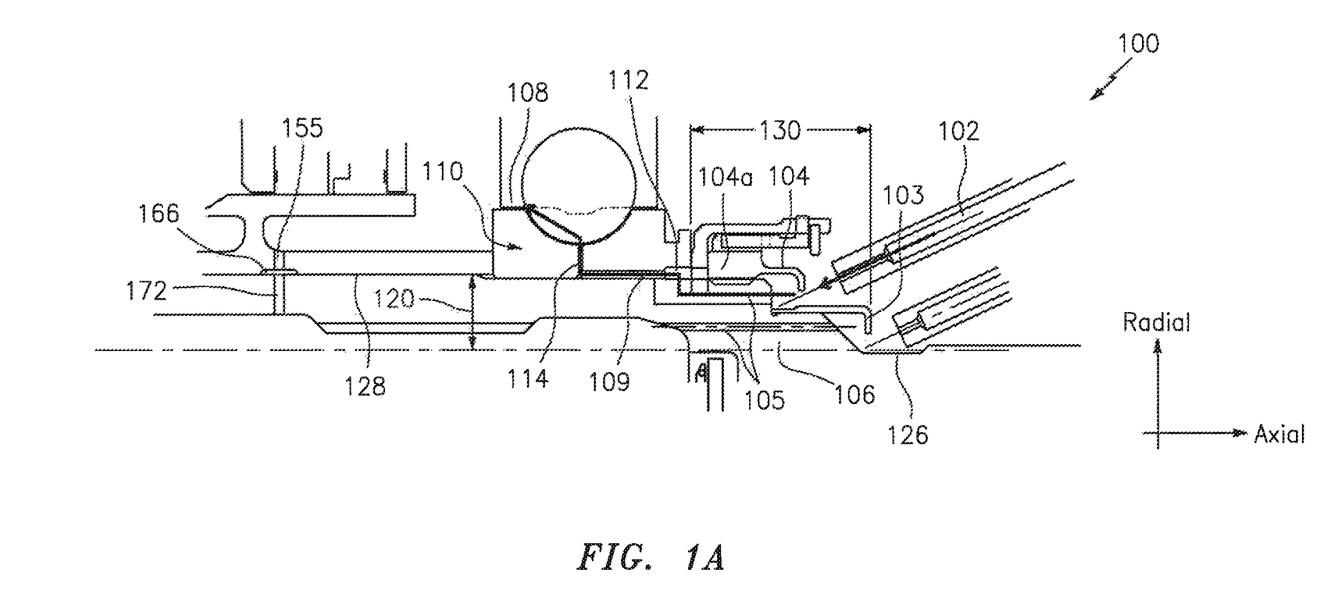
FIGS. 1A-1B illustrate an exemplary system for coupling an inner oil scoop and a shaft of an engine along with a concentric outer oil scoop which is integrated into a retaining nut.
Figure 1B:
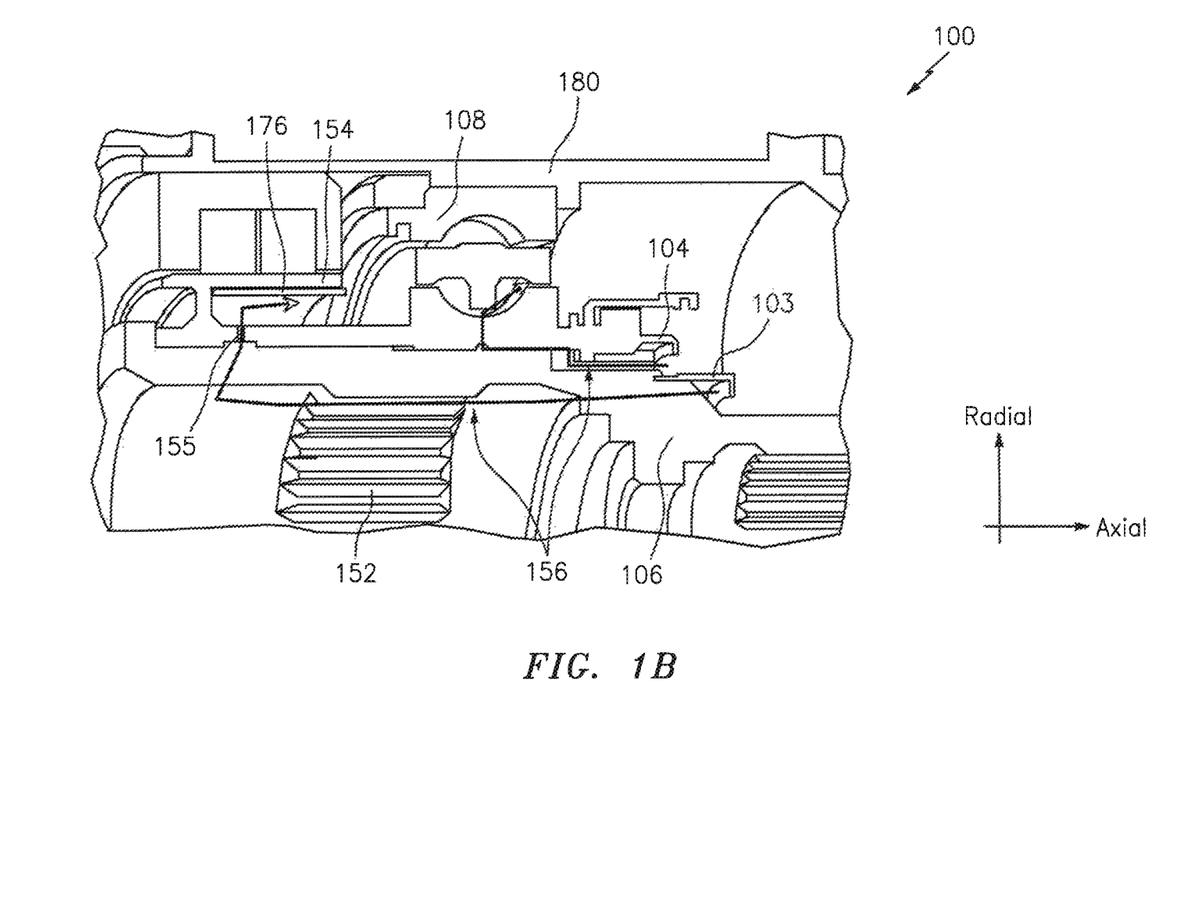

Aspects of the disclosure may be applied in connection with an engine of an aircraft, such as for example a multispool turboshaft engine associated with a helicopter. Furthermore, aspects of the disclosure may be applied in connection with an oil system of an engine. Referring to FIGS. 1A-1B, a portion of such an oil system is shown and is generally denoted by reference character 100.

Oil may be provided by one or more oil jets 102 to an inner oil scoop 103 and an outer oil scoop 104 (e.g., two axial oil scoops). The oil scoops 103 and 104 may be made of one or more materials, such as for example a metallic material or a non-metallic material.

The outer oil scoop 104 may be integrated with a nut 104a. The oil scoops 103 and 104 may cause the oil to be transferred via slots/holes 105 (e.g., axially-oriented slots/holes) in a shaft 106 to one or more components or devices that consume the oil, such as for example a bearing 108. The holes 105 may be located/placed at an outer diameter (OD) of the shaft 106. Holes 109 (e.g., axially-oriented holes) may be located/placed at an inner diameter (ID) of a bearing race 110. The bearing race 110 may include an annulus as denoted by reference character 112. Holes 114 (e.g., radially-oriented holes) associated with the bearing 108 or the bearing race 110 may be used in the conveyance of oil. For example, the annulus 112 may be used to feed oil from the slots/holes 105 in the shaft 106 to the slots/holes 114 in the bearing 108 inner diameter. The annulus 112 may be used to account for different shapes or orientations that are used between two or more of the slots/holes 105, the slots/holes 109, and the slots/holes 114.

The race 110 may be fabricated as a single piece or more than one piece. In embodiments where two pieces are used, such as the embodiment shown in FIG. 1A, the two pieces may be separated by a split line and the slots/holes 114 may in turn be split to accommodate each piece.

For reference purposes a radial space (i.e., a shaft thickness) or clearance between the shaft 106 and the bearing 108 is identified in FIG. 1A via reference character 120. This radial space 120 may be required to be relatively small. For example, the radial space 120 may be established or minimized based on balanced design goals of maximizing a shaft outer diameter 126 in order to carry torque while minimizing a hearing inner diameter 128 to reduce angular velocity which may be roughly proportional to bearing stress.

Also, an axial space or clearance is shown in FIG. 1A via reference character 130. The axial space 130 may be based on one or more factors. For example, from the perspective of the design of the shaft 106 it may be desirable to minimize the shaft length, i.e., keep the shaft 106 short (it may also be beneficial to keep a short spacing between bearings 108 due to shaft dynamic requirements). Furthermore, tradeoffs may be made to reduce axial space consumed by various components of an engine (e.g., compressor, combustor, turbine, etc.) where a shorter engine length may be desirable and will typically reduce engine weight and facilitate installation in the vehicle.

Referring to FIGS. 1A-1B, the oil may be conveyed from the oil scoop 104 via the shaft/shaft assembly 106 to a spline 152, such as for example a power turbine output spline. From the spline 152, the oil may be provided to the bearing 108 and/or a runner 154 (e.g., a carbon seal runner) via a groove 166 and one or more radially-oriented holes 155. There may be holes 172 through the shaft 106 that feed the groove 166. The bearing 108 and/or the runner 154 may consume at least a portion of the oil. Exemplary paths that the oil may follow are denoted in FIG. 1B via reference character 156.

Superimposed in FIG. 1B is a reference line 176. The reference line 176 provides an indication of a location where the oil cools the inside of the runner 154.

The components and devices described above in connection with FIGS. 1A-1B may be included within a housing 180, such as for example a bearing housing.

As described above, in some embodiments two concentric oil scoops (e.g., oil scoops 103 and 104) may be included. For example, multiple scoops may be used in a space-limited area (e.g., a radially or axially limited area) to ensure that a sufficient quantity or volume of oil is delivered to components that consume the oil. As part of a design procedure, a size/dimension of an oil scoop may be determined. The size/dimension of the oil scoop may be based on one or more parameters, such as space that is available. For example, a consideration when trying to create a large scoop is the dynamics/structural/stress requirements. If the "flat plate" forming the closed side of the scoop gets too radially tall this may present a stiffness problem. A more conical structure might be required, but this conical structure would consume axial space. Tradeoffs may be made based on the particular application environment/context to meet the structural requirements while maximizing the oil delivery rate in the given space.

Figure 1C:
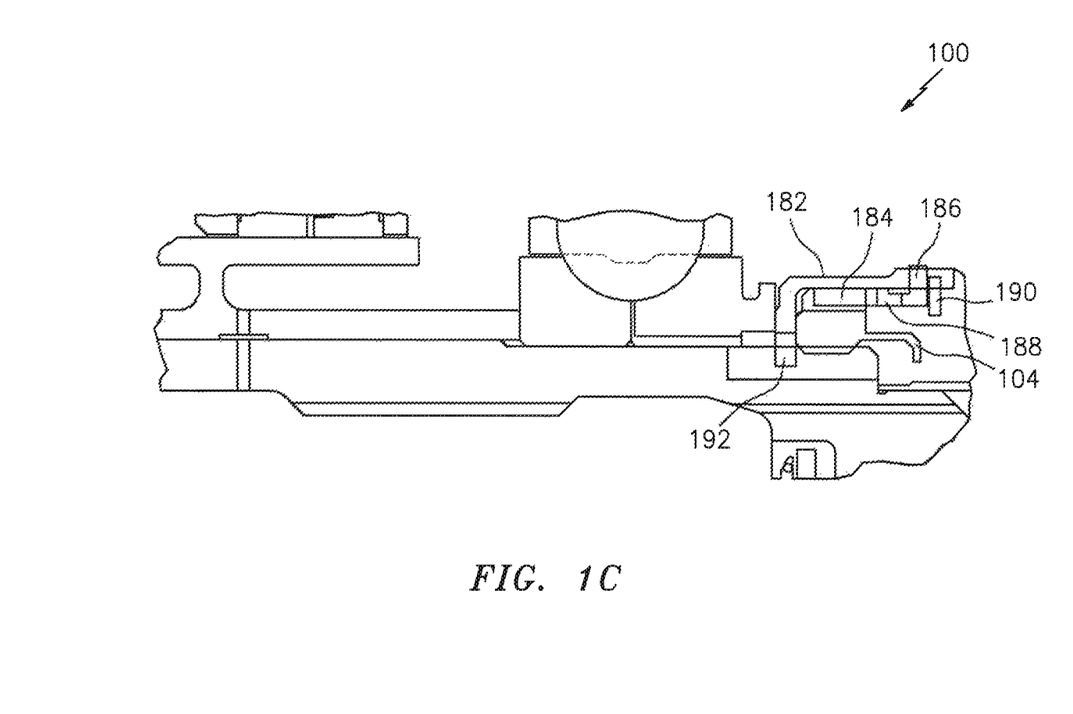
FIGS. 1C-1D illustrate exemplary locking configurations for locking the nut of the system of FIGS. 1A-1B.
Figure 1D:
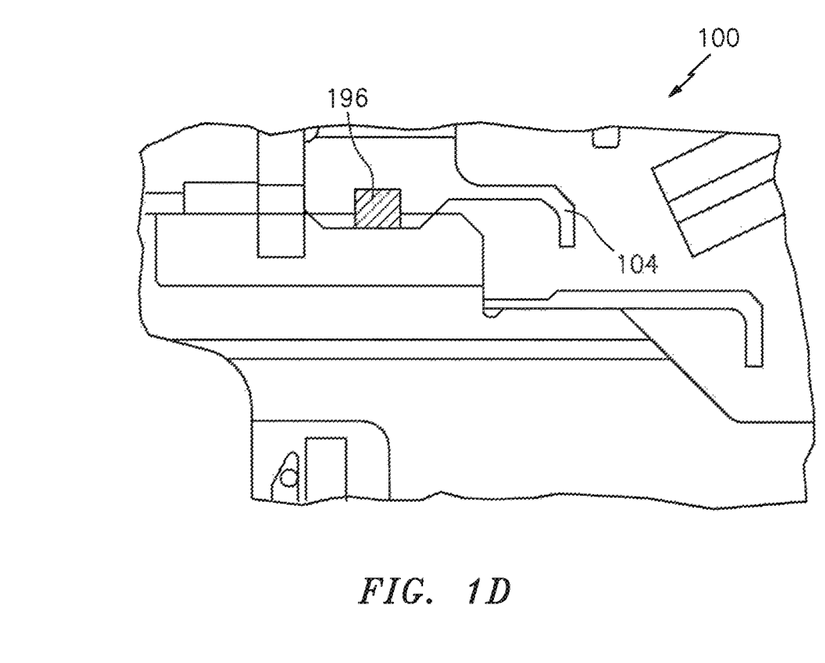

Referring to FIG. 1C, a closer view of a portion of the oil system 100 depicted in FIGS. 1A-1B is shown. In particular, in FIG. 1C the nut 104a is shown as being key locked. This key locked configuration may include a lock device 182, keys in nut slots 184, keys in lock device slots 186, a lock ring 188, a snap ring 190 to retain the lock ring 188, and keys in shaft slots 192. FIG. 1D illustrates another locking configuration incorporating a vespel lock nut (or other composite) 196. FIGS. 1C-1D represent exemplary locking configurations; other types of locking configurations may be used.

Figure 2:
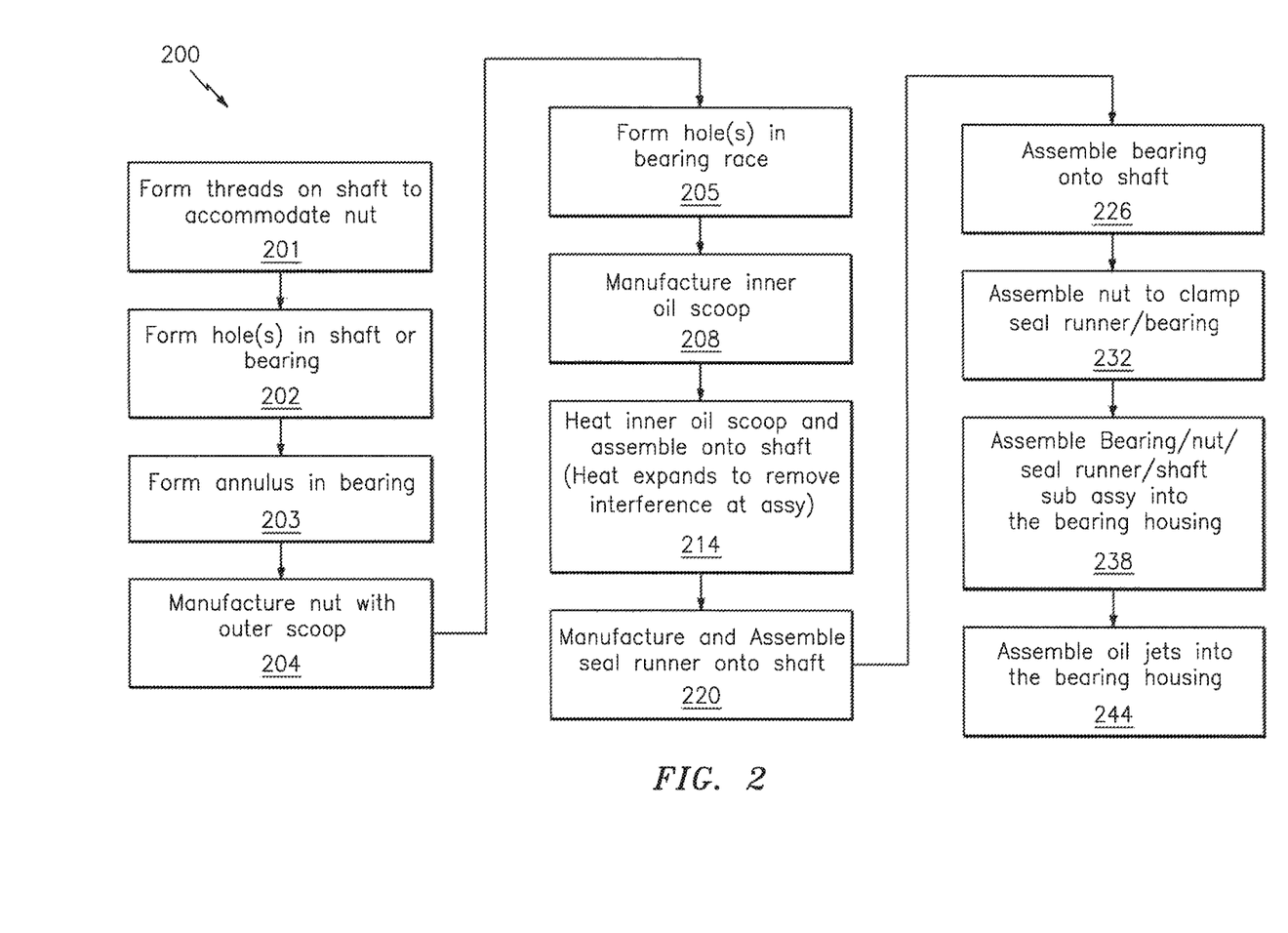
FIG. 2 illustrates an exemplary method for forming an oil system with concentric axial scoops.

Referring now to FIG. 2, a flow chart of an exemplary method 200 is shown. The method 200 may be executed by, or in conjunction with, one or more systems, components, or devices, such as those described herein. For example, the method 200 may be executed in order to form a portion of an oil system, such as the oil system 100 described above.

In block 201, one or more threads may be formed on a shaft to accommodate a nut. The shaft may be configured to be used in conjunction with an engine of an aircraft.

In block 202, slots/holes may be formed in the shaft or a bearing. At least one of the holes may be configured to be aligned with an engine axis, which is to say that the holes may be axially-oriented. At least one of the holes may be configured in a radial direction.

In block 203, an annulus may be formed in the bearing.

In block 204, the nut may be manufactured with an outer scoop. As part of block 204, a nut locking device (e.g., the configuration of FIG. 1C or FIG. 1D) may be manufactured and coupled to the nut.

In block 205, one or more holes may be formed in a bearing race. At least one of the holes may be configured to be aligned with an engine axis, which is to say that the holes may be axially-oriented. At least one of the holes may be configured in a radial direction.

In block 208, an inner oil scoop may be manufactured (e.g., machined).

In block 214 the inner oil scoop may be heated and assembled onto the shaft. Application of the heat may be used to remove interference at assembly.

In block 220, a seal runner may be manufactured and assembled onto the shaft. As part of block 220, one or more pilot diameters associated with a seal or bearing may be formed.

In block 226, a bearing may be assembled onto the shaft.

In block 232, the nut may be assembled to clamp the seal runner and/or the bearing. The nut may include, or be associated with, a locking device. The locking device may be metallic or non-metallic. The locking device may include, or be associated with, a thread locking compound.

In block 238, a sub assembly formed from, e.g., the bearing, nut, seal runner, and shaft may be assembled into a bearing housing.

In block 244, one or more oil jets may be assembled into the bearing housing. The oil jets may be configured as part of separate oil circuits, such that a first of the oil jets provides oil to a first oil scoop and a second of the oil jets provides oil to a second oil scoop.

The blocks described above in connection with the method 200 are illustrative. In some embodiments, the blocks may execute in an order or sequence that is different from what is shown and described above. In some embodiments, one or more of the blocks a portion thereof) may be optional. In some embodiments, additional blocks not shown may be included.

In some embodiments, oil may remove heat from one or more components (e.g., a seal runner, a bearing, a spline, etc.). The oil may be used to reduce friction as well as remove heat caused by any friction that is present.

Technical effects and benefits of the disclosure include a provisioning of concentric oil scoops. For example, aspects of the disclosure enable the use of one or more concentric axial scoops in environments where space is limited in one or more dimensions (e.g., radial space or axial space is limited).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system comprising:
   a shaft;
   a bearing race coupled to the shaft;
   a first axial oil scoop that receives oil and provides the oil to the shaft; and
   a second axial oil scoop that receives and provides oil to the shaft,
   wherein the second axial oil scoop is concentric with the first axial oil scoop.

2. The system of claim 1, wherein the shaft includes a first hole and the bearing race includes a second hole, and wherein the first and second holes are oriented axially with respect to the shaft.

3. The system of claim 1, wherein the bearing race includes a hole that is oriented radially with respect to the shaft.

4. A system comprising:
   a shaft including a first hole;
   a bearing race coupled to the shaft and including a second hole and a third hole;
   a first axial oil scoop that receives oil and provides the oil to the shaft; and
   a second axial oil scoop that receives and provides oil to the shaft,
   wherein the first and second holes are oriented axially with respect to the shaft,
   wherein the third hole is oriented radially with respect to the shaft, and
   herein the second axial oil scoop is concentric with the first axial oil scoop.

5. The system of claim 4, further comprising:
   at least one oil jet that provides the oil to the first axial oil scoop.

6. The system of claim 4, further comprising:
   a spline that conveys the oil axially forward to the third hole after the oil traverses at least one of the first hole and the second hole.

7. The system of claim 6, further comprising:
   the third hole conveying the oil from the spline to at least one of a seal runner and a bearing.

8. The system of claim 4, further comprising:
   a seal runner coupled to the shaft that transfers heat to at least a portion of the oil.

9. The system of claim 4, further comprising:
   a bearing coupled to the shaft that transfers heat to at least a portion of the oil.

* * * * *

UNITED STATES PATENT AND TRADEMARK OFFICE
CERTIFICATE OF CORRECTION

| | |
|---|---|
| PATENT NO. | : 10,047,649 B2 |
| APPLICATION NO. | : 14/754124 |
| DATED | : August 14, 2018 |
| INVENTOR(S) | : James L. Lucas |

It is certified that error appears in the above-identified patent and that said Letters Patent is hereby corrected as shown below:

On the Title Page

Item (57), in the abstract, Line 9, please delete "shall" and insert --shaft--.

In the Specification

Column 3, Line 43, please delete "hearing" and insert --bearing--.

Signed and Sealed this
Twenty-fifth Day of September, 2018

Andrei Iancu
*Director of the United States Patent and Trademark Office*